Aug. 13, 1957     L. A. MacNAUGHTON     2,802,305
FLOWERPOT ATTACHMENT
Filed Sept. 8, 1954
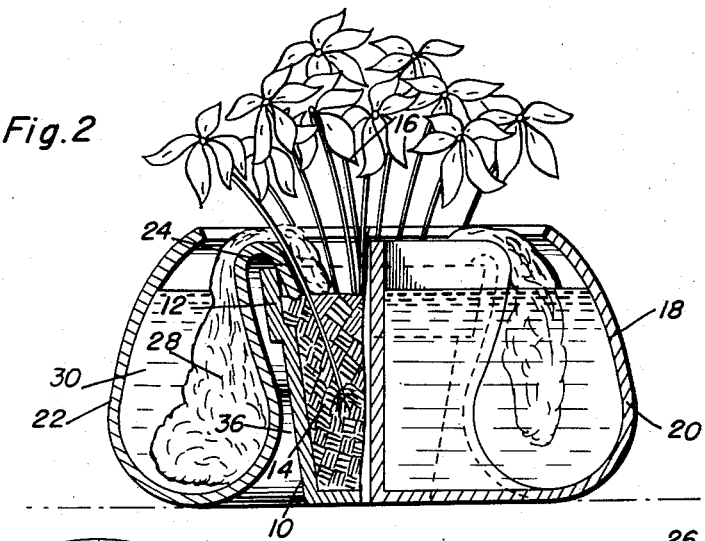
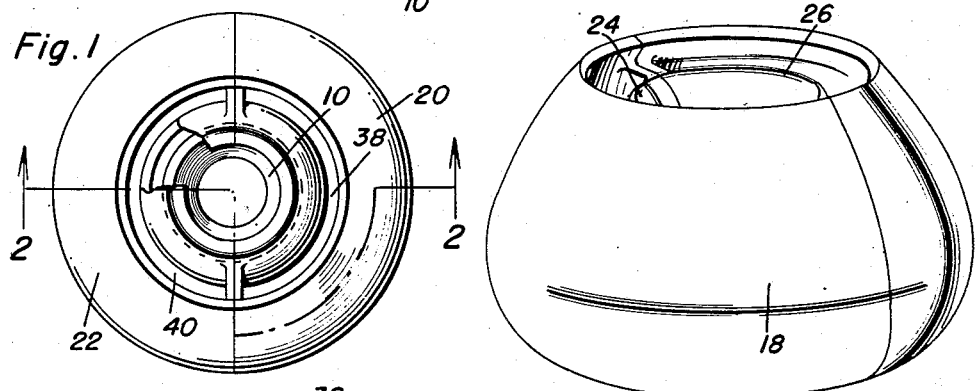
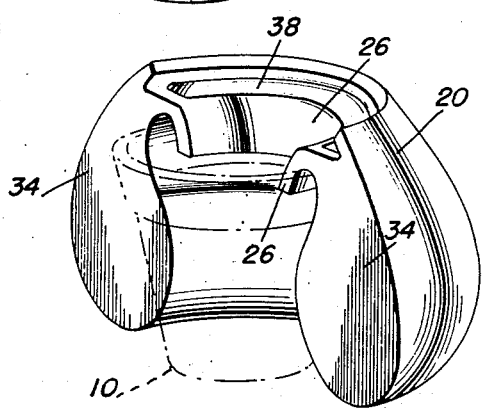
Lesley A. MacNaughton
INVENTOR.

United States Patent Office 2,802,305
Patented Aug. 13, 1957

2,802,305

FLOWERPOT ATTACHMENT

Lesley A. MacNaughton, Morrisville, Pa.

Application September 8, 1954, Serial No. 454,715

1 Claim. (Cl. 47—38)

This invention relates to an attachment for a flower pot or the like and has for its primary object the provision of self-watering means for the plants growing within the flower pot.

A further object of the invention resides in the provision of means for increasing the attractiveness of a conventional clay or equivalent flower pot by providing an ornamental attachment therefor which encircles and substantially hides the flower pot.

Another object of the invention resides in the provision of self-watering means for a flower pot including a wick immersible in a tear drop shape container for supplying moisture to the flower pot in which the attachment is spaced from the flower pot to form an air insulating space therebetween thus protecting the roots of the plant growing within the flower pot.

Yet another object of the invention resides in the provision of a flower pot attachment which not only is adapted to provide means for watering the flower pot but is adapted to receive cut flowers or the like therein.

Still further objects and features of this invention reside in the provision of a flower pot attachment that is strong and durable, simple in construction and manufacture, which can be constructed from various readily available materials which are highly attractive in appearance, and which is inexpensive to produce thereby permitting wide distribution and utilization.

These, together with the various ancillary objects and features of the invention which will become apparent as the following description proceeds, are attained by this flower pot attachment, a preferred embodiment of which has been illustrated in the accompanying drawings, by way of example only, wherein:

Figure 1 is a plan view of the flower pot attachment comprising the present invention;

Figure 2 is a vertical sectional view as taken along the plane of line 2—2 in Figure 1 illustrating the interior construction of the flower pot attachment;

Figure 3 is a perspective view of the flower pot attachment; and

Figure 4 is a perspective view of one of the sections of the flower pot attachment.

With continuing reference to the accompanying drawing wherein like reference numerals designate similar parts throughout the various views, reference numeral 10 generally designates a conventional flower pot provided with an upper flange 12 and adapted to receive soil 14 therein in which the roots of a plant 16 may extend. The flower pot attachment comprising the present invention generally is designated by reference numeral 18. It is adapted to provide water for the soil 14 so as to enhance the growing and feeding of the plant 16.

The attachment 18 comprises a pair of sections 20 and 22 each of which are substantially tear drop shaped in vertical section and has inner downwardly and inwardly extending flanges 24 and 26 integrally formed therewith. The flanges are adapted to overlie the flange 12 of the flower pot 10 so that the wicks 28 which are inserted in the fluid 30 contained within the tear drop shaped containers 20 and 22 and overlie the flanges and preferably touch the top of the soil 14 thereby transferring by means of capillary action the water in the containers 20 and 22 to the soil 14.

The end walls of the containers 20 and 22 are substantially vertical as is indicated at 34 and the containers are arranged so as to encompass the flower pot 10. It is noted that the inner surfaces of the flower pot attachment 18 is spaced from the outer surfaces of the flower pot 10 to form an air space 26 which has the highly advantageous purpose of providing insulation for the flower pot 10. Further, the utilization of the air space 36 together with the wicks 28 serves to keep the atmosphere about the soil 14 and the plant 16 comparatively humid thereby assuring proper growth and long life of the plant even when the plant is located indoors in a heated room.

The containers 20 and 22 are provided with openings as at 38 and 40 in the upper surfaces thereof into which cut flowers or the like may be extended to further provide a decorative and highly ornamental piece. It is recognized that plant food or the like may be incorporated in the fluid 30.

The tear drop shape of the containers 20 and 22 is highly advantageous so as to provide the maximum quantity of fluid 30 in view of the truncated conical shape of the flower pot 10.

It will be seen that the containers may be treated as complemental half-sections of an over-all annular container wherein the latter encompasses and shrouds the otherwise and sometimes undesirably finished flower pot. The sections, when placed around the flower pot, form a self-standing ornamental enclosure as well as reservoir for the feed water. The depending apron-like flanges are hook-shaped in cross-section so that the free edge portions of the "hooks" engage over the upper edge of the flower pot to bring about the desired retention of the two half-sections. These half-sections may be channel-shaped in cross-section. The fact that the upper ends are open enables the half-sections to function each as a vase.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

For use on and in association with a conventional type clay or equivalent flower pot, an ornamental readily applicable and removable covering comprising a pair of duplicate half-sections channel-shaped in cross-section and substantially semi-circular in plan, the entire upper ends of said sections being unobstructably open and the respective vertical ends being flat and providing end walls, the respective end walls abutting one another, said sections serving as containers for water and being usable either with cut flowers when they each function as a vase, or as reservoirs when irrigating wicks are used in conjunction therewith, the inner walls of said containers adjacent to and encompassing said flower pot being spaced from the flower pot and the upper edges thereof being provided with depending hook-shaped flanges, said flanges being commensurate in length with said sections adapted to take over the upper edge portion of said flower pot in a manner to releasably hold the sections in cooperative positions on the flower pot.

(References on following page)

References Cited in the file of this patent
UNITED STATES PATENTS

| | | |
|---|---|---|
| 164,208 | Portington | June 8, 1875 |
| 267,296 | Wilder | Nov. 7, 1882 |
| 986,395 | Ring | Mar. 7, 1911 |

FOREIGN PATENTS

| | | |
|---|---|---|
| 523,640 | France | Apr. 26, 1921 |
| 322,809 | Germany | July 9, 1920 |